(12) United States Patent
Bisht et al.

(10) Patent No.: US 9,201,799 B2
(45) Date of Patent: Dec. 1, 2015

(54) METHOD FOR DISK DEFRAG HANDLING IN SOLID STATE DRIVE CACHING ENVIRONMENT

(71) Applicant: Samsung Electronics Co., Ltd., Suwon-si (KR)

(72) Inventors: Pradeep Bisht, Mountain View, CA (US); Jiurong Cheng, Milpitas, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 248 days.

(21) Appl. No.: 13/909,027

(22) Filed: Jun. 3, 2013

(65) Prior Publication Data

US 2014/0359211 A1 Dec. 4, 2014

(51) Int. Cl.
*G06F 12/08* (2006.01)

(52) U.S. Cl.
CPC ........ *G06F 12/0866* (2013.01); *G06F 12/0888* (2013.01); *G06F 2206/1004* (2013.01)

(58) Field of Classification Search
None
See application file for complete search history.

(56) References Cited

U.S. PATENT DOCUMENTS

| | | | |
|---|---|---|---|
| 6,205,529 B1* | 3/2001 | Shagam | 711/170 |
| 8,359,430 B1* | 1/2013 | Fair | 711/113 |
| 2008/0077762 A1* | 3/2008 | Scott et al. | 711/170 |
| 2008/0140905 A1* | 6/2008 | Okuyama et al. | 711/4 |
| 2009/0037661 A1* | 2/2009 | Fairhurst | 711/133 |
| 2009/0049238 A1* | 2/2009 | Zhang et al. | 711/113 |
| 2013/0007341 A1* | 1/2013 | Juenemann et al. | 711/102 |

* cited by examiner

*Primary Examiner* — Kaushikkumar Patel
(74) *Attorney, Agent, or Firm* — Renaissance IP Law Group LLP

(57) ABSTRACT

An invention is provided for handling target disk access requests during disk defragmentation in a solid state drive caching environment. The invention includes detecting a request to access a target storage device. In response, data associated with the request is written to the target storage device without writing the data to the caching device, with the proviso that the request is a write request. In addition, the invention includes reading data associated with the request and marking the data associated with the request stored in the caching device for discard, with the proviso that the request is a read request and the data associated with the request is stored on the caching device. Data marked for discard is discarded from the caching device when time permits, for example, upon completion of disk defragmentation.

22 Claims, 9 Drawing Sheets

METHOD FOR DISK DEFRAG HANDLING IN SOLID STATE DRIVE CACHING ENVIRONMENT

BACKGROUND OF THE INVENTION

1. Field of the Invention

This invention relates generally to disk caching, and more particularly to disk defrag handling in a solid state drive caching environment.

2. Description of the Related Art

Caching has long been used to enhance the performance of slower storage devices, such as disk drives. In caching, a smaller and faster storage medium is utilized to temporarily store and retrieve frequently used data, while a larger and typically slower mass storage medium is used for long term storage of data. However, as will be described in greater detail below, unwanted stress on the caching device can occur during the disk defragmentation processes.

File fragmentation occurs when a file's contents is placed in noncontiguous blocks on the underlying storage device. For example, when files are first written to a new disk, generally the data blocks of each file are stored consecutively, as illustrated in FIG. 1A. Here, an otherwise blank hard disk drive (HDD) 100 has two files: file A and file B. The HDD 100 includes a plurality of blocks 0-9, 10-19, . . . , 50-59. In the illustration of FIG. 1A, file A is stored in blocks 0-19, while file B is stored in blocks 20-49. As discussed above, when files are first written to the disk drive 100, the data blocks of each file are stored consecutively. In this manner, the data can be accessed continuously and thus reduce movement of the disk actuator. However, as files are modified and deleted, empty blocks are created on the disk in which no valid data is stored, as illustrated in FIG. 1B.

FIG. 1B is a block diagram illustrating the hard disk drive 100 of FIG. 1A wherein file A is deleted and new file C is written to the hard disk drive 100. When file A is deleted, blocks 0-19 become free blocks. When new files are added, the file system typically uses these empty blocks to store blocks of the new files. Hence, file C is written to the first free space on the HDD 100, which in FIG. 1B is blocks 0-14. That is, in this example, file C is not as large as file A and thus uses less space on the HDD 100.

As new files continue to be added, the new files begin to be stored in noncontiguous blocks, and are thus fragmented. FIG. 1C is a block diagram illustrating the HDD 100 of FIG. 1B wherein file D is written to the HDD 100. Similar to file C described above, file D is written to the first available position on the HDD 100. Because file C is smaller than deleted file A, free space exists between file C and file B on the HDD 100. The file system utilizes this free space to store data for file D, and part of file D is stored in blocks 15-19. The remainder of file D is stored in the next first available block, which in the example of FIG. 1C are blocks 50-59.

FIG. 1D is a block diagram illustrating the hard disk drive 100 of FIG. 1C wherein file C is deleted and new files E and F are written to the hard disk drive 100. When file C is deleted, blocks 0-14 become free blocks. Next, file E is written to the first free space on the HDD 100, which in FIG. 1D is blocks 0-9, and file F is written to blocks 10-14 and 60-69. Hence, as files are added and deleted the HDD 100 becomes increasingly fragmented. Disk fragmentation causes input/output (I/O) performance issues, particularly for HDD because the spinning HDD requires a long head seek time when accessing fragmented files.

To alleviate this situation defragmentation programs have been developed. Defragmentation programs reduce disk fragmentation by rearranging the data blocks of fragmented files into contiguous locations on the storage device. In general, during a disk defragmentation process the data blocks are rearranged on the HDD such that the blocks from the same file are as contiguous as possible allowing the blocks to be accessed using the fewest number of random seeks as possible. After the defragmentation process, a file can be accessed from the HDD more sequentially as opposed to random access. As a result, access to the file becomes faster. However, in systems having disk caching such as solid state drive (SSD) caching, defragmentation can have a detrimental affect on SSD endurance.

Disk caching generally uses a smaller and faster storage medium to temporarily store and retrieve frequently used data, while the larger and typically slower mass storage medium, such as an HDD, is used for long term storage of data. One caching methodology is write-back caching, wherein data written to a disk is first stored in a cache and later written to the mass storage device, typically when the amount of data in cache reaches some threshold value or when time permits.

As mentioned previously, a cache generally comprises a smaller, faster access storage than that used for the target storage device. Because of the enhance speed of the cache, reads and writes directed to the cache are processed much faster than is possible using the target storage device. Write-back caching takes advantage of these differences by sending all write requests to the write-back cache before later transferring the data to the target storage device.

However, the benefits of caching generally are not realized during a defragmentation process because the data present on the HDD is being moved around without any particular importance to the user. That is, the disk defragmentation process generally creates many reads and writes that have no correspondence to the importance of the data to the user. As a result, the cache typically is populated with data that is unimportant to the user and thus will not benefit from being cached. Moreover, the increased number of disk access operations and resulting writes to the caching device, particularly SSD caching devices, causes unnecessary wear on the SSD device that can result in severe endurance problems and data loss.

In view of the foregoing, there is a need for systems and methods that account for caching device endurance during a disk defragmentation process. Ideally, the systems and methods should provide a means for protecting caching devices from unnecessary wear during disk defragmentation, yet not require a user of the system to remember to perform extra pre-defragmentation processes or operations prior to defragmentation.

SUMMARY OF THE INVENTION

Broadly speaking, embodiments of the present invention address these needs by altering the caching methodology in response to defragmentation to account for the reads and writes generated from the defragmentation process. In one embodiment, a method for handling target disk access requests during disk defragmentation in a solid state drive caching environment is disclosed. The method includes detecting a request to access a target storage device. In response, data associated with the request is written to the target storage device without writing the data to a caching device, with the proviso that the request is a write request. In addition, the method includes reading data associated with the request and marking the data associated with the request stored in the caching device for discard, with the proviso that the request is a read request and the data associated with the request is stored on the caching device. Then data marked for discard is discarded from the caching device when time permits, for example, upon completion of disk defragmentation. When the request is a read request and the data is not stored in the caching device, data associated with the request is read without caching the data.

An additional method for handling disk access requests during disk defragmentation of a target storage device in a solid state drive caching environment is disclosed in a further embodiment. As above, a request is detected to access a target storage device. Then, with the proviso that the request is a write request, data associated with the request is written to the target storage device without writing the data to a caching device. In addition, the method includes reading data associated with the request and marking the data associated with the request stored in the caching device for discard, with the proviso that the request is a read request and the data associated with the request is stored on the caching device. If the request is a read request and the data is not stored in the caching device then data associated with the request is read without caching the data. Data marked for discard is then discarded from the caching device upon completion of disk defragmentation.

In a further embodiment, a computer program embodied on a computer readable medium is disclosed for handling disk access requests during disk defragmentation of a target storage device in a solid state drive caching environment. The computer program includes computer instructions that detect a request to access a target storage device and computer instructions that determine a type of the request. Upon a condition in which the request is a write request, data associated with the write request is written to the target storage device without writing the data to a caching device. Upon a condition in which the request is a read request and data associated with the read request is stored on the caching device, the data associated with the request is read from the caching device and marked for discard. In addition, the computer program includes computer instructions that discard data marked for discard from the caching device, generally upon completion of disk defragmentation. Similar to above, computer instructions can be include that, upon a condition in which the request is a read request and read data associated with the read request is not stored in the caching device, read the read data without caching the read data. Computer instructions can also be included that perform normal caching operations when defragmentation is complete.

In this manner, data which is merely being moved during disk defragmentation, and that is not important to the user, is not stored in on caching device as a result of the write request. Also, data that is being moved during disk defragmentation will no longer be stored in caching device. Moreover, embodiments of the present invention avoid additional cache writes during disk defragmentation, significantly reducing the wear that can occur to SSD caching devices during the disk defragmentation process. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for managing disk defragmentation in an SSD caching environment. In general, when embodiments of the present invention detect the start of a defragmentation process, the caching methodology changes to account for the reads and writes generated from the defragmentation process. Write operations bypass the cache and are allowed to directly access to the target storage device, as are read operations that result in a read cache miss. However, read cache hits result in the requested data being provided from the caching device and the associated cached data being marked for discard, since the defragmentation process will move the underlying data.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1A:
FIG. 1A is a block diagram illustrating an otherwise blank hard disk drive (HDD) having two files: file A and file B.
Figure 1B:
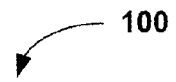
FIG. 1B is a block diagram illustrating the hard disk drive of FIG. 1A wherein file A is deleted and new file C is written to the hard disk drive.
Figure 1C:
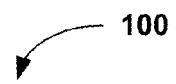
FIG. 1C is a block diagram illustrating the HDD of FIG. 1B wherein file D is written to the HDD.
Figure 1D:
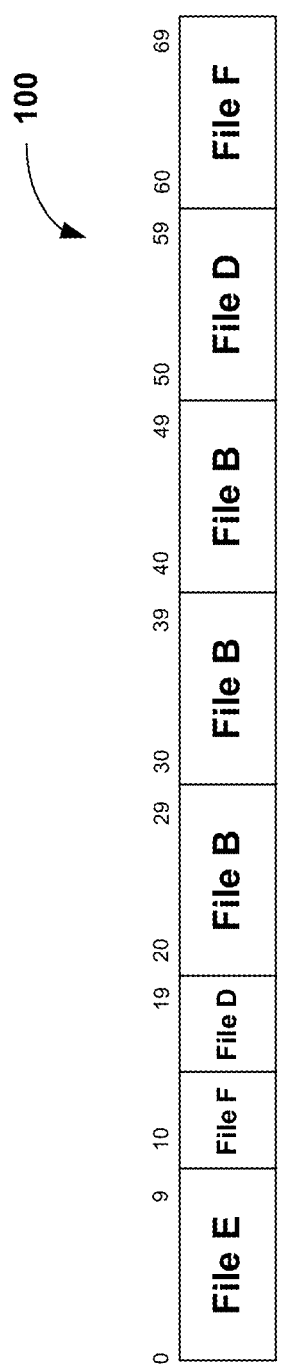
FIG. 1D is a block diagram illustrating the hard disk drive of FIG. 1C wherein file C is deleted and new files E and F are written to the hard disk drive.
Figure 2:
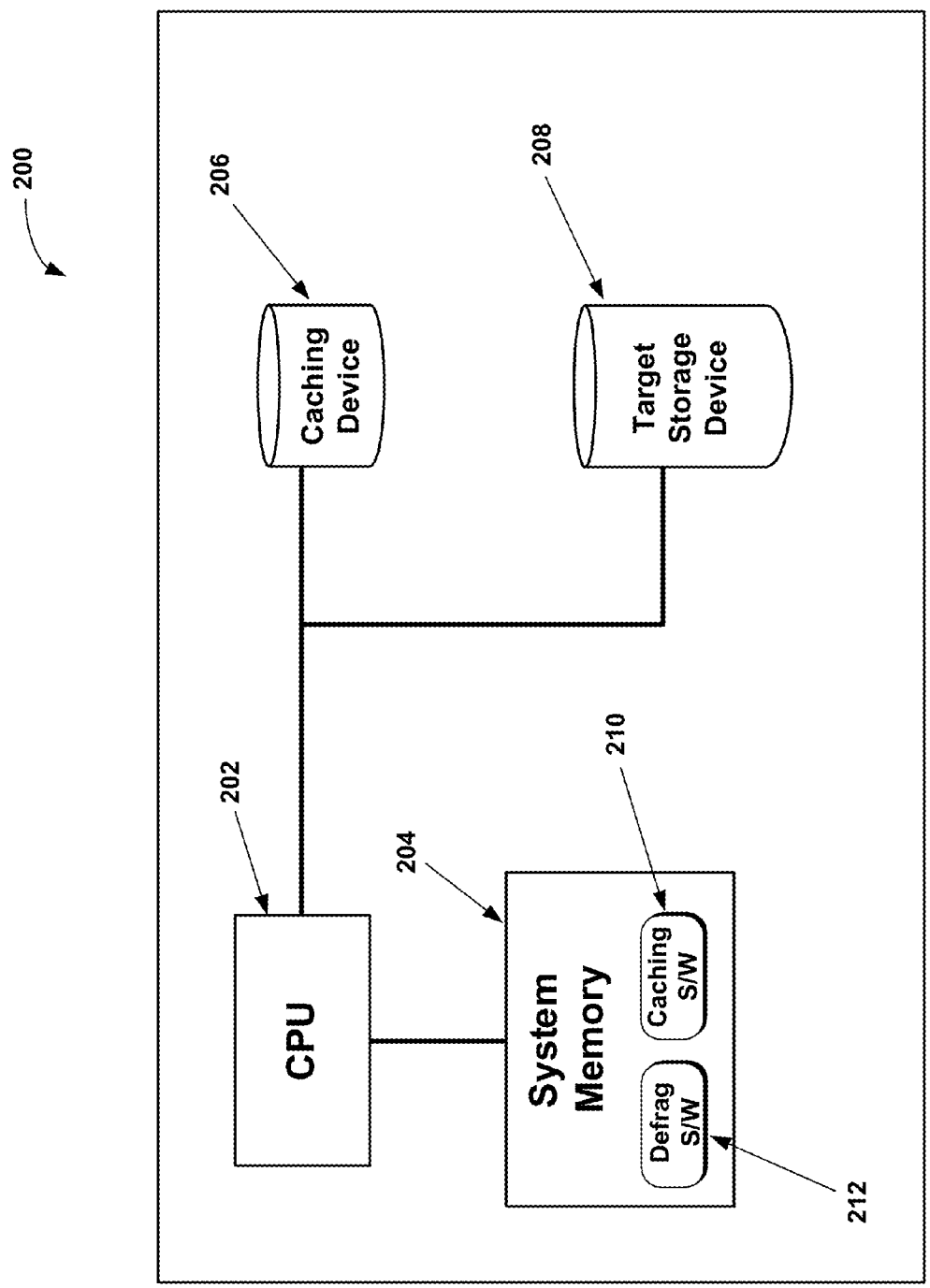
FIG. 2 is a block diagram showing an exemplary computer system having a solid state drive caching environment, in accordance with an embodiment of the present invention.

FIG. 2 is a block diagram showing an exemplary computer system 200 having a solid state drive caching environment, in accordance with an embodiment of the present invention. The computer system 200 includes a central processing unit (CPU) 202 connected to system memory 204, a caching device 206, and a target storage device 208, such as a hard disk drive. During operation, caching software 210 is loaded into system memory 204 to facilitate caching functionality on the computer system 200.

Generally, the caching device 206 is a smaller and faster access drive than that used for the target storage device 208. For example, the caching device 206 can be a solid state drive (SSD) such as NAND flash based SSD or phase change memory (PCM). Because of the enhance speed of the caching device 206, reads and writes directed to the caching device 206 are processed much faster than is possible using the target storage device 208. Caching takes advantage of these differences by sending write requests to the caching device 206 before later transferring the data to the target storage device 208. The caching software 210 provides a complete view of the target storage device 208, so the user always sees a complete view of the target storage device 208, regardless of whether or not some data is actually stored on the caching device 206.

Figure 3:
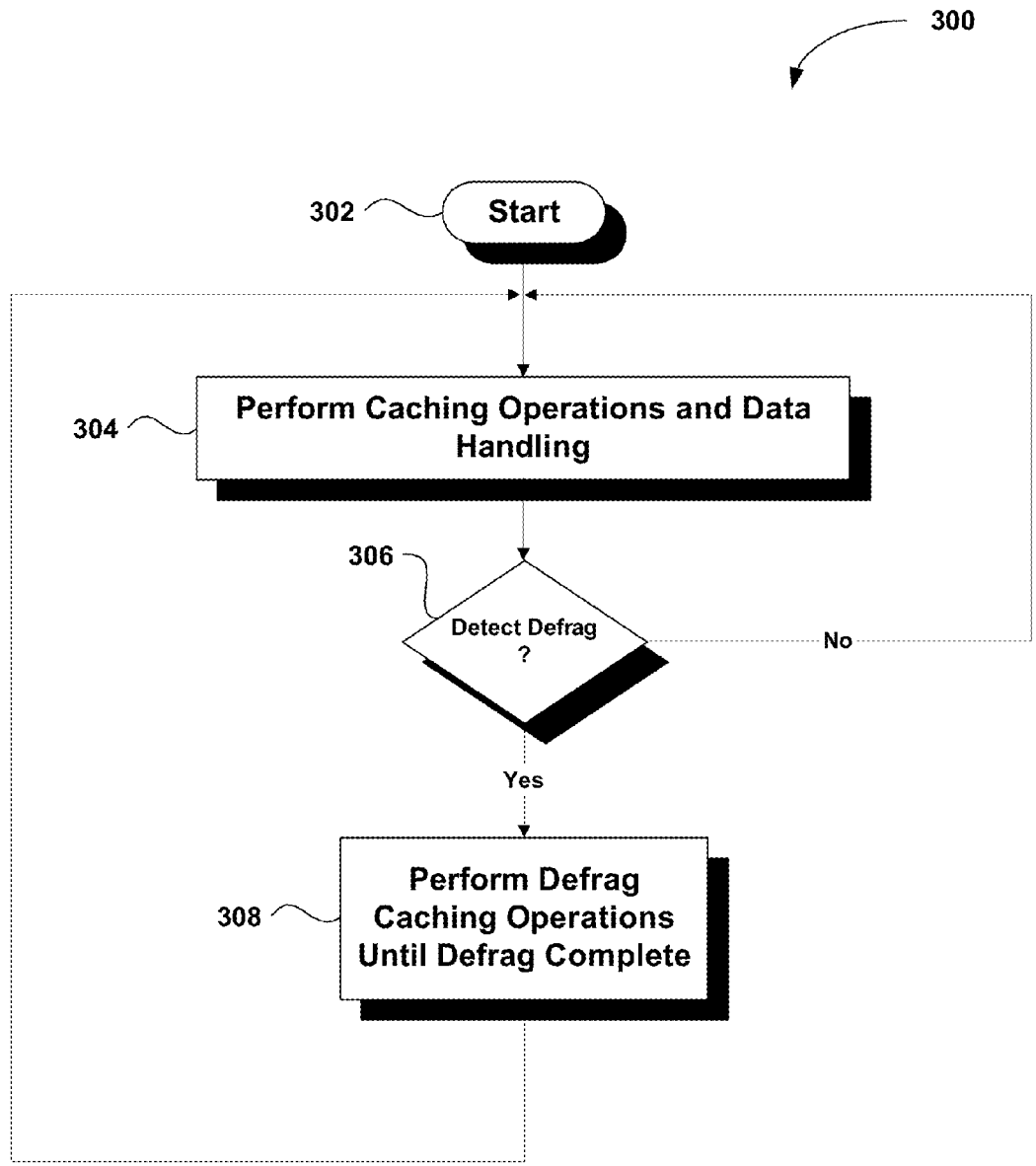
FIG. 3 is a flowchart showing a method handling storage I/O operations in a caching environment, in accordance with an embodiment of the present invention.

FIG. 3 is a flowchart showing a method 300 for handling storage I/O operations in a caching environment, in accordance with an embodiment of the present invention. In an initial operation 302, preprocess operations are performed. Preprocess operations can include, for example, loading caching software into memory, loading operating system files, and other system start-up operations that will be apparent to those skilled in the art with the hindsight provided after a careful reading of the present disclosure.

In operation 304, the caching software 210 performs caching operations in its normal, non-defrag, mode of operation. During normal operation, the caching software 210 intercepts read and write requests to enhance input/output (I/O) via the caching device 206. Specifically, when the CPU 202 processes a write request to write data to the target storage device 208, the caching software 210 intercepts the request and writes the data to the caching device 206. When the CPU 202 processes a read request, the caching software 210 again intercepts the request and determines whether the data is currently stored on the caching device 206. When the data is stored on the caching device 206, the CPU 202 reads the data from the caching device 206; otherwise the CPU 202 reads the data from the target storage device 208.

However, as files are added and deleted from the target storage device 208 it becomes increasingly fragmented, causing I/O performance issues. To alleviate this situation, defragmentation software 212 can be loaded into the system memory 204. The defragmentation software 212 functions to reduce disk fragmentation by rearranging the data blocks of fragmented files into contiguous locations on the target storage device 208. That is, the defragmentation software 212 rearranges the data blocks on the target storage device 208 such that blocks from the same file are located as contiguously as possible allowing the blocks to be accessed using the fewest number of random seeks.

Hence, in operation 306 a decision is made as to whether disk defragmentation operations are to be performed. The caching software 210 of the embodiments of the present invention detects when the defragmentation software 212 begins executing, for example, by receiving a trigger through the operating system application programming interface (API). If commencement of disk defragmentation operations is not detected, the method 300 continues to perform caching operations in its normal, non-defrag, mode of operation 304. However, when the caching software 210 detects commencement of disk defragmentation operations, the mode of operations changes to a defrag caching mode of operation, in operation 308.

In operation 308, the caching software 210 performs caching operations in a defrag mode of operation. Embodiments of the present invention rely on a defrag trigger to determine when disk defragmentation operations begin. When disk defragmentation operations begin the caching software detects a defrag trigger via the OS API. From that point, and until defragmentation process ends (typically notified by another trigger), the caching software 210 adjusts to a defrag mode of operation. In the new defrag mode of operation, the caching software 210 functions to reduce the amount of wear on the caching device 206 by allowing disk write access operations to bypass the caching device 206 and removing data from the caching device 206 that is affected by the defragmentation process, as illustrated next with reference to FIG. 4.

Figure 4:
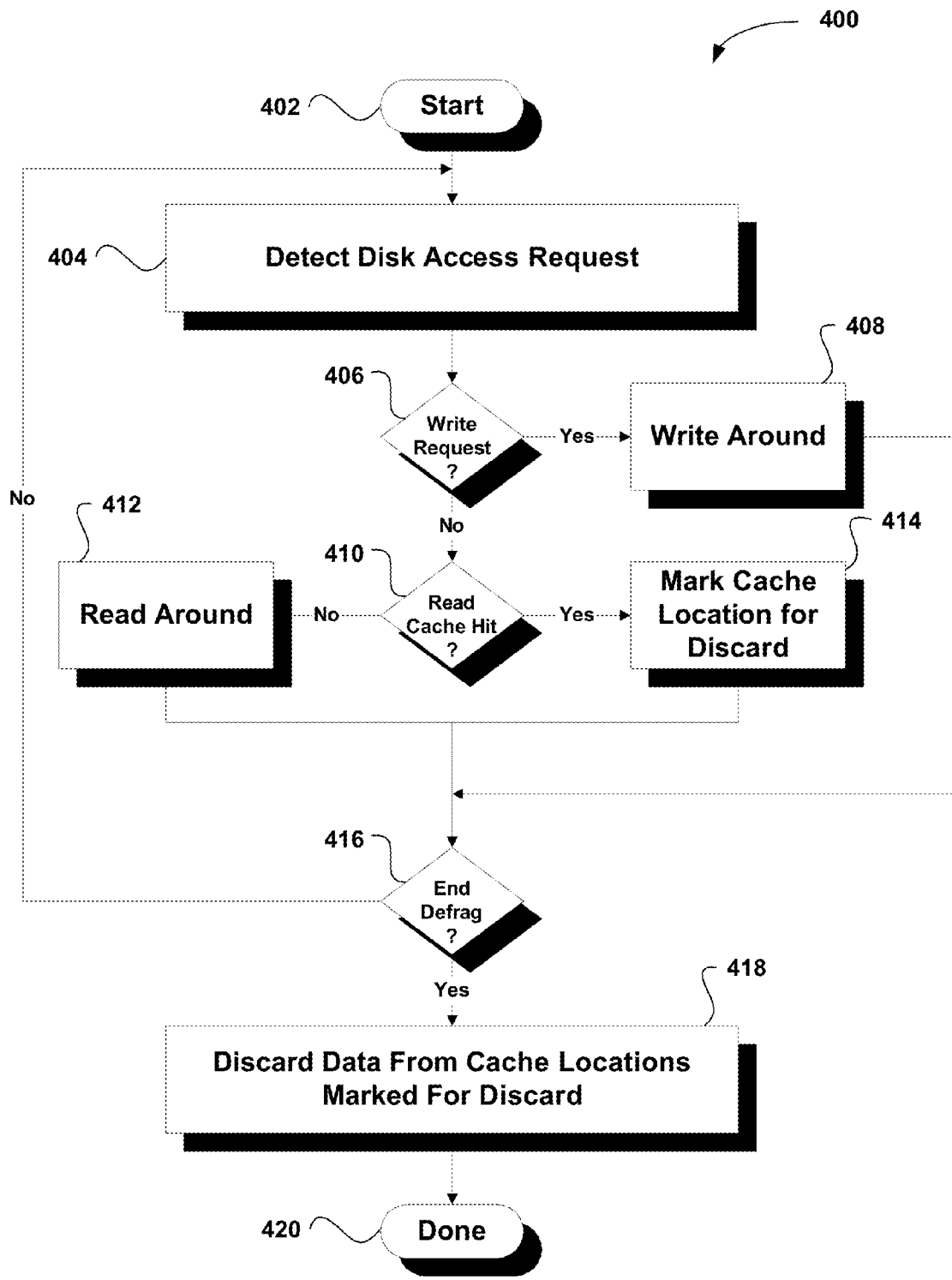
FIG. 4 is a flowchart showing a method for handling target disk access requests during disk defragmentation in a solid state drive caching environment.

FIG. 4 is a flowchart showing a method 400 for handling target disk access requests during disk defragmentation in a solid state drive caching environment. In an initial operation 402, preprocess operations are performed. Preprocess operations can include, for example, determining whether the disk defragmentation process has begun, and other preprocess operations that will be apparent to those skilled in the art after a careful reading of the present disclosure.

In operation 404, a request to access the target storage device is detected. As mentioned above, the defragmentation software 212 functions to reduce disk fragmentation by rearranging the data blocks of fragmented files into contiguous locations on the target storage device 208. Hence, the defragmentation software 212 rearranges the data blocks on the target storage device 208 such that blocks from the same file are located as contiguously as possible allowing the blocks to be accessed using the fewest number of random seeks. This is accomplished via a series of read and write requests to the target storage device 208. Embodiments of the present invention detect these requests in operation 404.

A decision is then made as to whether the detected request is a write request, in operation 406. If the detected request is a write request, the method 400 branches to a write around operation 408. Otherwise, the request is a read request, which is evaluated in operation 410.

When the detected request is a write request, data associated with the request is written to the target storage device, in operation 408. Disk caching using a SSD caching device can be performed at either the file system level, or at the block level. Block level caching has the advantage of being file system agnostic. Hence, it is advantageous for the embodiments of the present invention to be capable of operating at the block level. However, at the block level the caching software does not have the knowledge of the file system itself. Therefore, it is difficult to match file names from block I/O requests. When defragmentation software is processing a particular file, the caching software generally only is aware of various block I/O requests without any relation to the file. As a result, it is difficult to correlate the block I/O request and remap them because of the lack of file system knowledge. Thus, embodiments of the present invention rely on a trigger that indicates a defragmention process has begun. From that point, data associated with I/O requests is written to the target storage device without writing the data to the caching device, with the proviso that the request is a write request, as illustrated next with reference to FIG. 5.

Figure 5:
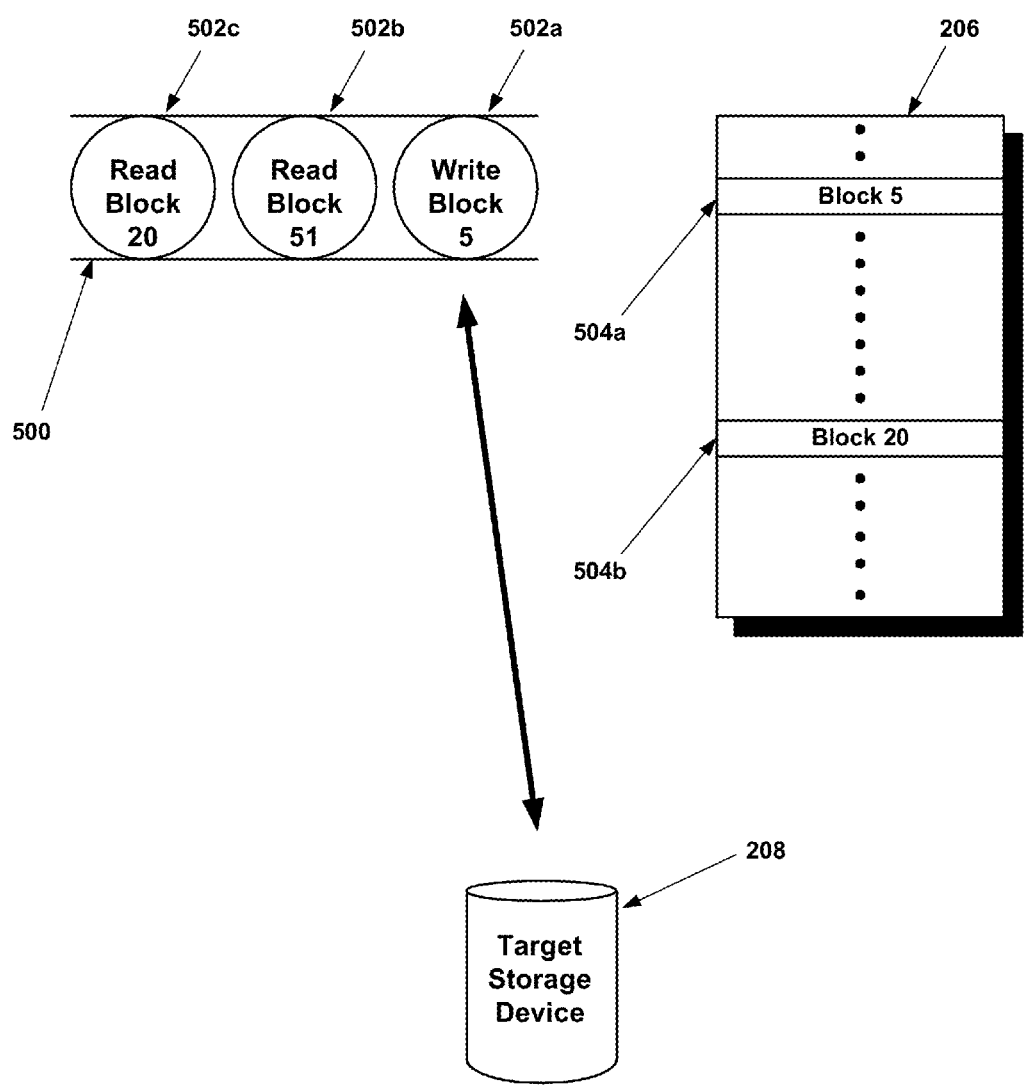
FIG. 5 is a block diagram showing caching operations for a write request during the defrag mode of operation of the caching software, in accordance with an embodiment of the present invention.

FIG. 5 is a block diagram showing caching operations for a write request during the defrag mode of operation of the caching software, in accordance with an embodiment of the present invention. FIG. 5 includes a command queue 500, having a plurality of I/O requests 502a-502c directed to the target storage device 208. In addition, an exemplary caching device 206 is included that includes a plurality of cache entries 504a-504b. In the example of FIG. 5, the next request is write request 502a directed to the target storage device 208. Since the request is write request, the data associated with the write request 502a is written directly to the target storage device 208 without being written to the caching device 206. In this manner, data which is merely being moved during disk defragmentation and that is not important to the user is not stored in on caching device 206 as a result of the write request. In addition, avoiding additional cache writes during disk defragmentation significantly reduces the wear that can occur to SSD caching devices during the disk defragmentation process.

Turing back to FIG. 4, when the detected request is a read request, a decision is made as to whether the read request results in a read cache hit, in operation 410. In operation 410, the read request address is compared with the contents of the caching device to determine whether the requested read location data is currently stored in the caching device. If the read request results in a read cache miss, the method 400 branches to a read-around operation 412. Otherwise, the method 400 branches to a cache location discard operation 414.

Figure 6:
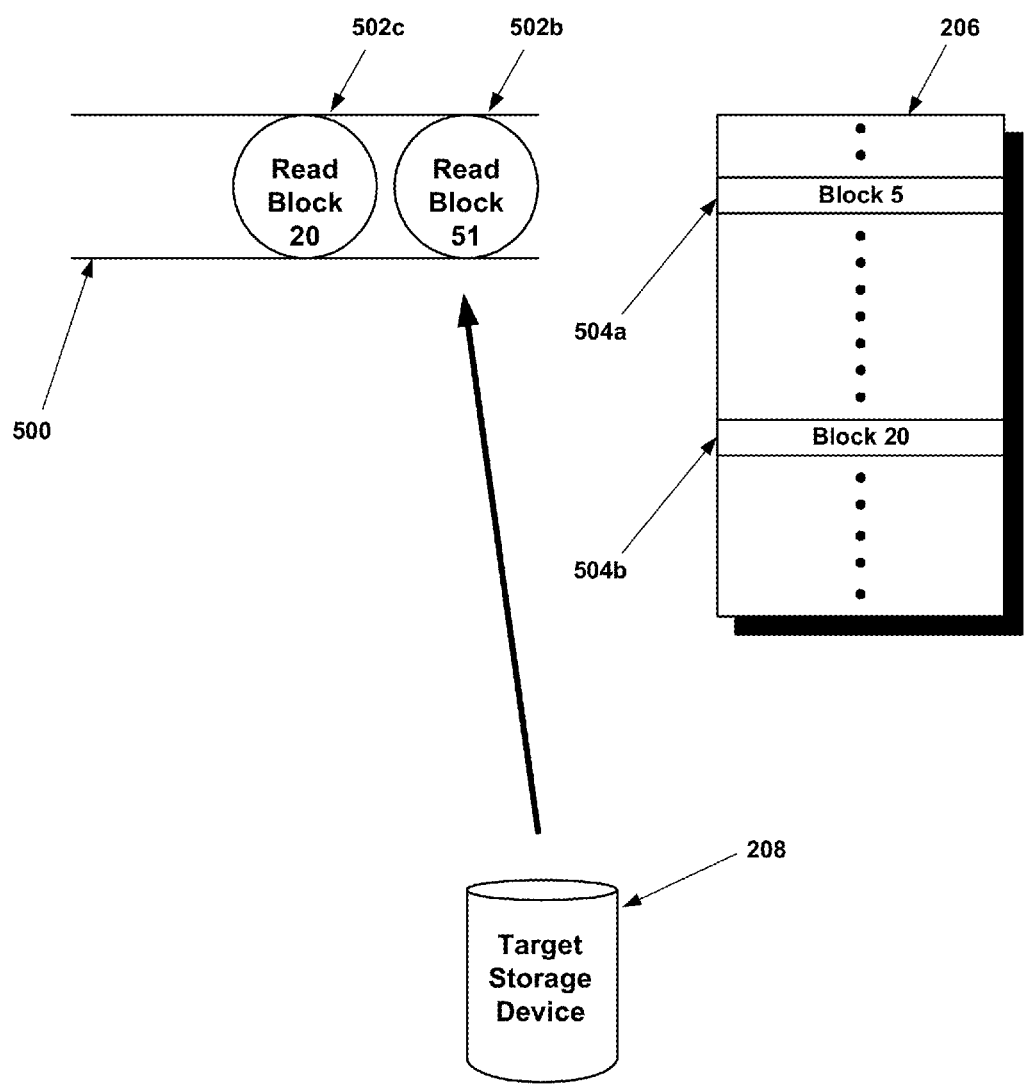
FIG. 6 is a block diagram showing caching operations for a read request resulting in a read cache miss during the defrag mode of operation of the caching software, in accordance with an embodiment of the present invention.

When the read request results in a read cache miss, the data associated with the read request is read from the target storage device, in operation 412. For example, FIG. 6 is a block diagram showing caching operations for a read request resulting in a read cache miss during the defrag mode of operation of the caching software, in accordance with an embodiment of the present invention. FIG. 6 includes the command queue 500, having the remaining of I/O requests 502b-502c directed to the target storage device 208. In addition, the exemplary caching device 206 is included having a plurality of cache entries 504a-504b. In the example of FIG. 6, the next request is read request 502b directed to block 51 of the target storage device 208.

The caching device 206 is examined to determine whether block 51 is currently stored in the caching device 206. In the example FIG. 6, block 51 is not stored in the caching device 206, resulting in a cache read miss. Since read request 502b resulted in a cache read miss, the data associated with the read request 502b is read directly from the target storage device 208 without being read from the caching device 206.

Figure 7:
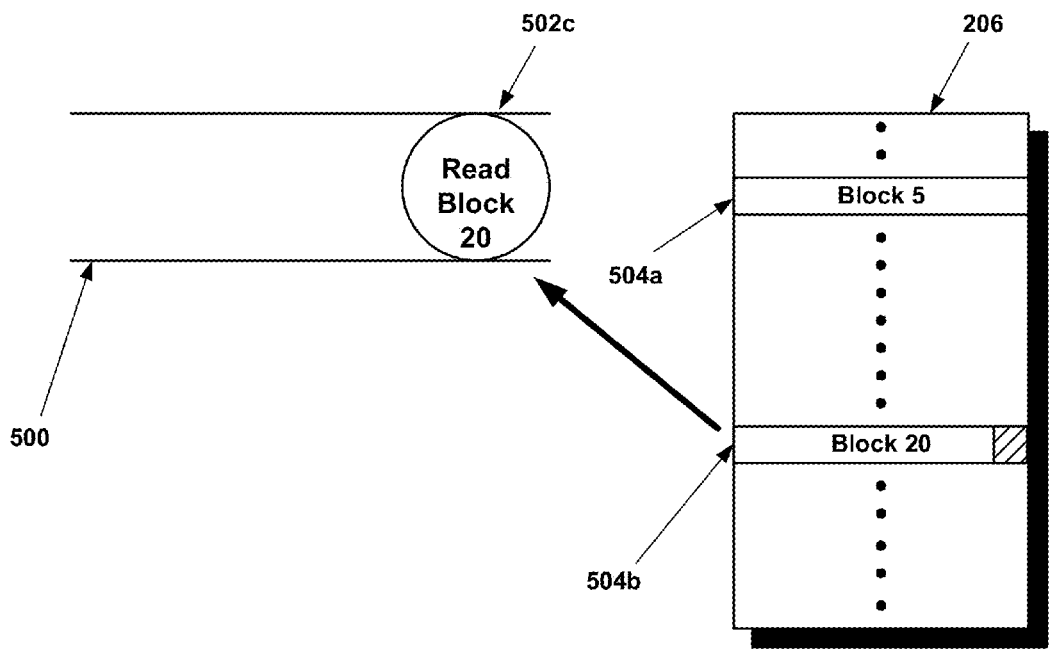
FIG. 7 is a block diagram showing caching operations for a read request resulting in a read cache hit during the defrag mode of operation of the caching software, in accordance with an embodiment of the present invention.
Figure 7:
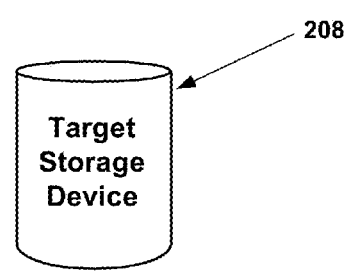

Referring back to FIG. 4, when the read request results in a read cache hit, the data associated with the read request is read from the caching device and the location storing the requested cached data is marked for discard, in operation 414. For example, FIG. 7 is a block diagram showing caching operations for a read request resulting in a read cache hit during the defrag mode of operation of the caching software, in accordance with an embodiment of the present invention. FIG. 7 includes the command queue 500, having the remaining of I/O request 502c directed to the target storage device 208. In addition, the exemplary caching device 206 is included having a plurality of cache entries 504a-504b. In the example of FIG. 7, the next request is read request 502c directed to block 20 of the target storage device 208.

When read request 502c is detected, the caching device 206 is examined to determine whether block 20 is currently stored in the caching device 206. In the example FIG. 7, block 20 is stored in the caching device 206, resulting in a cache read hit. Since read request 502c resulted in a cache read hit, the data associated with the read request 502c is read from the caching device 206 without being read from the target storage device 208. In addition, the location in the caching device 206 storing the data from block 20 of the target storage device 208 is marked for discard. This data will then be discarded from the caching device 206 at some later point, typically after the disk defragmentation process is completed.

Generally, during a disk defragmentation process, data is read from target storage device so it can be moved to a new location. Thus, when a read cache hit occurs during a disk defragmentation process, the data being read will be moved to a new location. As a result, the cache hit location in the cache will no longer store data important to the user, at least not as part of the same file. Hence, embodiments of the present invention mark this data location for discard, generally to be removed after the disk defragmentation process. In this manner, data that is being moved during disk defragmentation will no longer be stored in caching device 206.

Referring back to FIG. 4, a decision is made as to whether the defragmentation process has ended, in operation 416. As mentioned previously, when disk defragmentation operations begin the caching software detects a defrag trigger via the OS API. From that point, and until defragmentation process ends (typically notified by another trigger), the caching software adjusts to a defrag mode of operation. Hence, if the defragmentation process has not ended, the method 400 continues with another I/O request detection operation 404. Otherwise, the disk defragmentation operations have ended and the method continues to discard operation 418.

In operation 418, data marked for discard in the caching device is processed. As discussed previously, when read request results in a cache read hit, the data associated with the read request is read from the caching device, and the location in the caching device storing the data associated with the read request is marked for discard. In operation 418 this data is processed. It should be noted that operation 418 can occur at any point that time permits, based on the processing needs of the system. Processing the location marked for discard can include, for example, invalidating the location data, and/or erasing the data stored at the cache location and adding the memory location to free memory.

Figure 8:
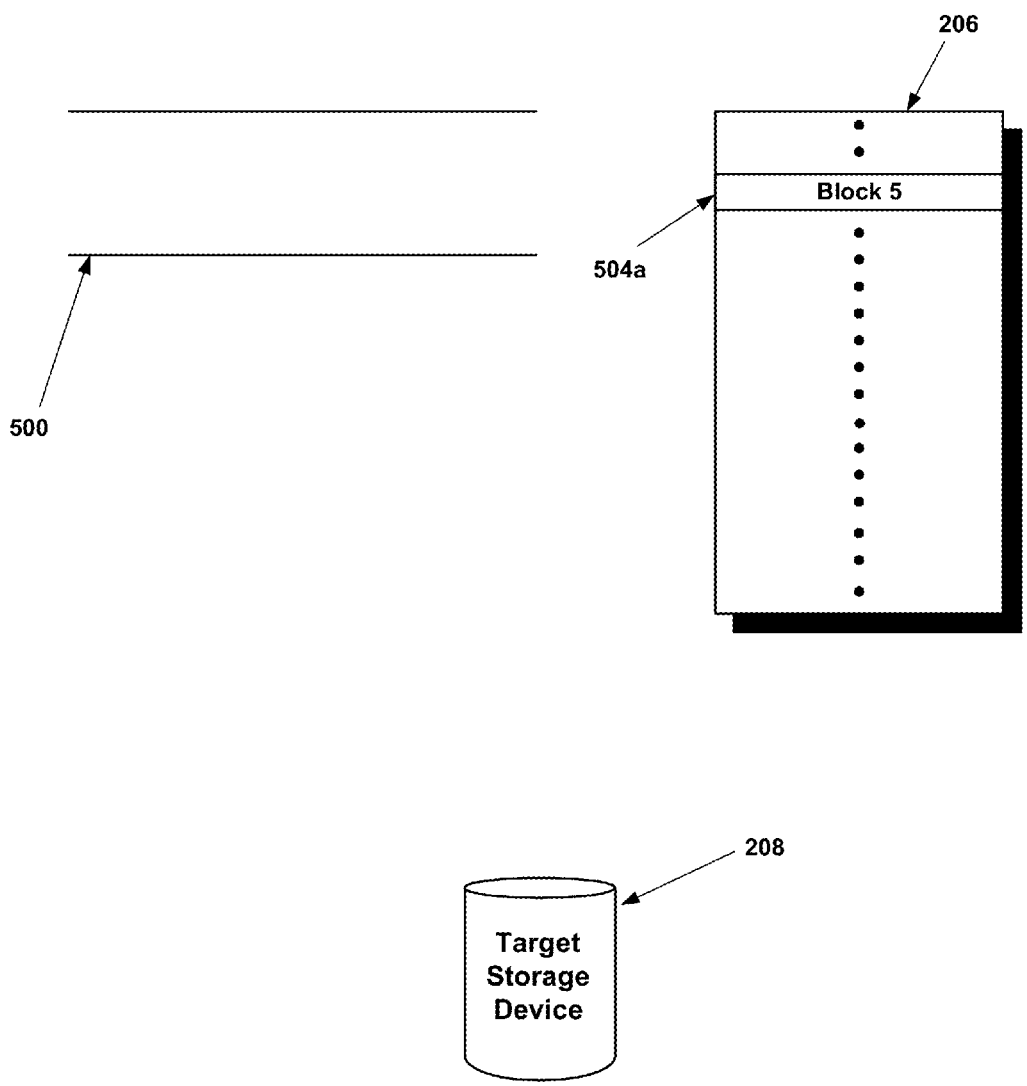
FIG. 8 is a block diagram showing the cache after defragmentation operations have ended, in accordance with an embodiment of the present invention.

For example, FIG. 8 is a block diagram showing the cache after defragmentation operations have ended, in accordance with an embodiment of the present invention. Since read request 502c of FIG. 7 resulted in a cache read hit, the location in the caching device 206 storing the data associated with read request 502c was marked for discard. As a result, block 20, which was marked for discard, has been logically removed from the list of entries stored in the caching device 206.

Turning back to FIG. 4, post process operations are performed in operation 420. Post process operations can include, for example, resuming normal, non-defrag caching operations, updating the caching device based on selected replacement policies, and other post process operations that will be apparent to those skilled in the art after a careful reading of the present disclosure.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for handling target disk access requests during disk defragmentation of a target storage device in a solid state drive caching environment including the target storage device and a caching device, comprising:

detecting a request to access the target storage device;

writing data associated with the request to the target storage device without writing the data to the caching device, with the proviso that the request is a write request;

reading data associated with the request and marking the data associated with the request stored in the caching device for discard, with the proviso that the request is a read request and the data associated with the request is stored on the caching device; and discarding data marked for discard from the caching device.

2. A method as recited in claim 1, wherein the data marked for discard is discarded upon completion of disk defragmentation.

3. A method as recited in claim 1, further comprising detecting a system call to begin defragmentation of the target storage device.

4. A method as recited in claim 1, further comprising performing normal caching operations when defragmentation is complete.

5. A method as recited in claim 1, wherein the target storage device is a hard disk drive and the caching device is a solid state drive.

6. A method as recited in claim 1, wherein a table is used to mark data stored in the caching device for discard.

7. A method as recited in claim 1, further comprising, if the request is the write request, marking for discard data stored on the caching device associated with the write request.

8. A method for handling disk access requests during disk defragmentation of a target storage device in a solid state drive caching environment including the target storage device and a caching device, comprising:

detecting a request to access the target storage device;

writing data associated with the request to the target storage device without writing the data to the caching device, with the proviso that the request is a write request;

reading data associated with the request and marking the data associated with the request stored in the caching device for discard, with the proviso that the request is a read request and the data associated with the request is stored on the caching device;

reading data associated with the request without caching the data, with the proviso that the request is a read request and the data is not stored in the caching device; and discarding data marked for discard from the caching device.

9. A method as recited in claim 8, wherein the data marked for discard is discarded upon completion of disk defragmentation.

10. A method as recited in claim 8, further comprising detecting a system call to begin defragmentation of the target storage device.

11. A method as recited in claim 8, further comprising performing normal caching operations when defragmentation is complete.

12. A method as recited in claim 8, wherein the target storage device is a hard disk drive and the caching device is a solid state drive.

13. A method as recited in claim 8, wherein a table is used to mark data stored in the caching device for discard.

14. A method as recited in claim 8, further comprising, if the request is the write request, marking for discard data stored on the caching device associated with the write request.

15. A computer program embodied on a non-transitory computer readable medium for handling disk access requests during disk defragmentation of a target storage device in a solid state drive caching environment including the target storage device and a caching device, comprising:

computer instructions that detect a request to access the target storage device;

computer instructions that determine a type of the request, and:

upon a condition in which the request is a write request, write data associated with the write request to the target storage device without writing the data to the caching device;

upon a condition in which the request is a read request and data associated with the read request is stored on the caching device, read the data and mark the data associated with the request stored in the caching device for discard; and computer instructions that discard data marked for discard from the caching device.

16. A computer program as recited in claim 15, wherein the data marked for discard is discarded upon completion of disk defragmentation.

17. A computer program as recited in claim 15, further comprising computer instructions that, upon a condition in which the request is a read request and read data associated with the read request is not stored in the caching device, read the read data without caching the read data.

18. A computer program as recited in claim 15, further comprising computer instructions that detect a system call to begin defragmentation of the target storage device.

19. A computer program as recited in claim 15, further comprising computer instructions that perform normal caching operations when defragmentation is complete.

20. A computer program as recited in claim 15, wherein the target storage device is a hard disk drive and the caching device is a solid state drive.

21. A computer program as recited in claim 15, wherein a table is used to mark data stored in the caching device for discard.

22. A computer program as recited in claim 15, further comprising computer instruction that, if the request is the write request, mark for discard data stored on the caching device associated with the write request.

* * * * *